US006182685B1

United States Patent
Goff et al.

(10) Patent No.: US 6,182,685 B1
(45) Date of Patent: Feb. 6, 2001

(54) INJECTOR STRUCTURE FOR LIQUID ADDITIVES

(75) Inventors: Christopher Waddell Goff; Charles Melvin King, both of Charlotte, NC (US)

(73) Assignee: Wellman, Inc., Shrewsbury, NJ (US)

( * ) Notice: Under 35 U.S.C. 154(b), the term of this patent shall be extended for 0 days.

(21) Appl. No.: 09/271,143

(22) Filed: Mar. 17, 1999

(51) Int. Cl.[7] .................................................. F16K 49/00
(52) U.S. Cl. ........................ 137/340; 137/240; 137/375
(58) Field of Search .................... 137/340, 240, 137/375

(56) References Cited

U.S. PATENT DOCUMENTS

| | | |
|---|---|---|
| 905,745 * | 12/1908 | Orr ........................................ 137/340 |
| 2,063,180 | 12/1936 | Meyer et al. . |
| 3,969,312 | 7/1976 | Lees . |
| 4,340,552 | 7/1982 | Roberts . |
| 4,728,475 | 3/1988 | Beck . |
| 4,802,886 | 2/1989 | Boocock . |
| 5,002,480 * | 3/1991 | Gellert et al. ........................ 425/549 |
| 5,116,547 | 5/1992 | Tsukahara et al. . |
| 5,130,069 | 7/1992 | Tietz et al. . |
| 5,389,327 | 2/1995 | Longhi . |
| 5,613,986 | 3/1997 | Bessey et al. . |
| 5,741,532 | 4/1998 | Lilly et al. . |

FOREIGN PATENT DOCUMENTS

| | | | |
|---|---|---|---|
| 962252 * | 6/1950 | (FR) ........................................ 137/340 |
| 1193403 * | 11/1959 | (FR) ........................................ 137/340 |

* cited by examiner

Primary Examiner—A. Michael Chambers
(74) Attorney, Agent, or Firm—Philip Summa, P.A.

(57) ABSTRACT

An injector structure is disclosed for delivering liquid additives, and particularly colorants, into a polyester production system capable of being cleaned without removal from a production line. The device includes a valve body with an internal channel extending longitudinally therein, a hollow housing for receiving a reciprocating stem, and an insulating jacket for minimizing the affect that heat from a melt extruder may have on the liquid colorant as the liquid colorant flows through the injector. A fluid inlet in communication with the internal channel is provided for delivering fluid from an external source to the valve body. The reciprocating stem, in an open position, allows liquid colorant to flow from the fluid inlet through the internal channel and out of a discharge opening at one end of the valve body. In a closed position, the reciprocating stem blocks the internal channel thereby preventing delivery of the fluid from the fluid inlet to the discharge opening. By reciprocating the stem within the internal channel, any obstructing matter is loosened, thereby allowing an uninterrupted flow of liquid colorant through the injector structure.

19 Claims, 2 Drawing Sheets

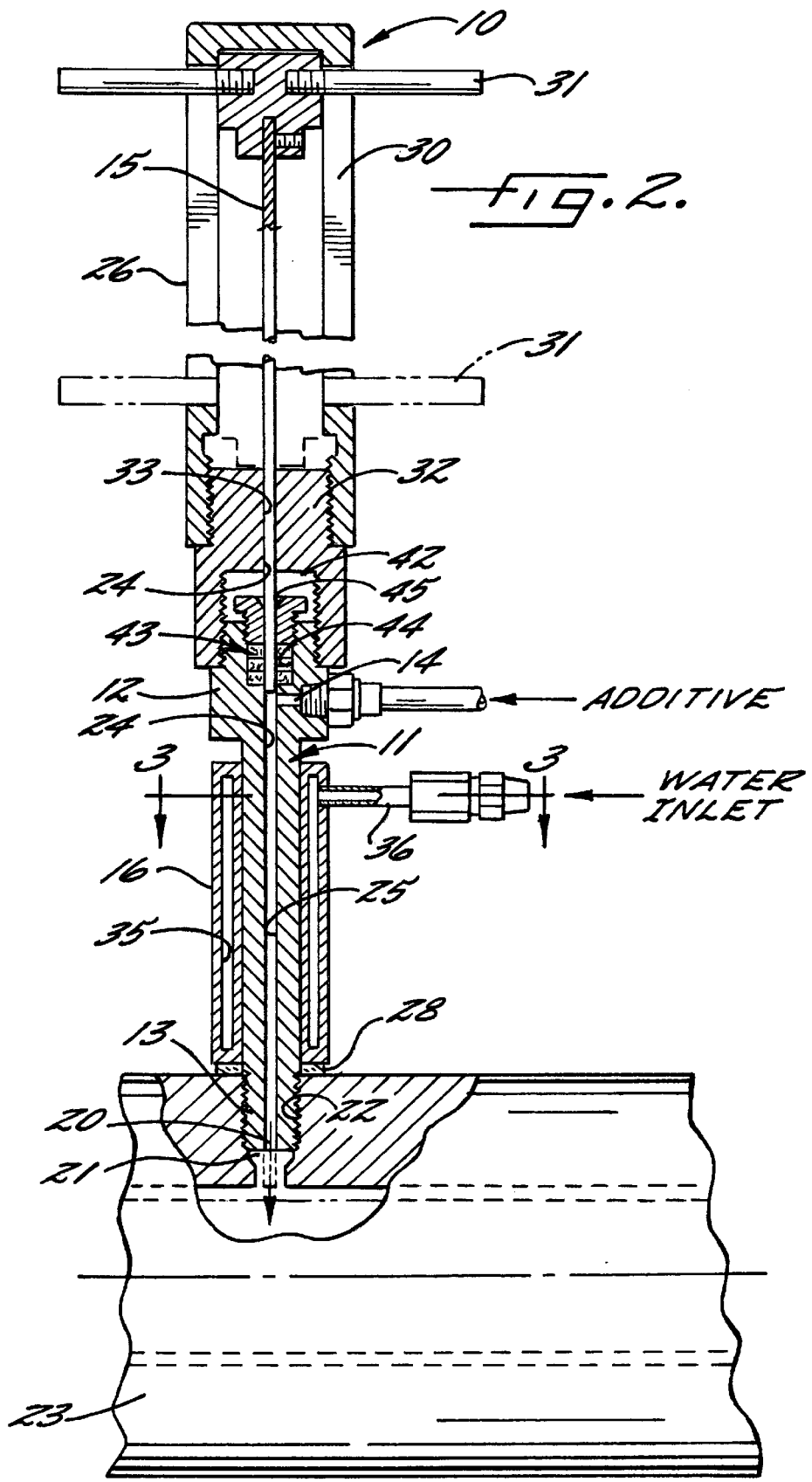

INJECTOR STRUCTURE FOR LIQUID ADDITIVES

FIELD OF THE INVENTION

The present invention relates to an apparatus for injecting additives into synthetic polymer filaments to form yarns and fabrics in a melt-spinning process, and more particularly relates to an injector structure for delivering liquid colorant into base chip to produce colored polyester filament. This application is related to copending application Ser. No. 08/929,831 filed Sept. 15, 1997, for "Melt Spinning Polycondensation Polymers."

BACKGROUND OF THE INVENTION

The textiles industry uses synthetic fibers for a wide variety of applications including clothing and other fabric items which are desirably manufactured and marketed in a variety of colors and patterns. In many circumstances, the synthetic fibers are white or natural in color; therefore, manufacturing techniques are required to add color to synthetic fibers.

As known to those familiar with the textile arts, various techniques are used to obtain the desired color in various textile products. Typically, conventional techniques include adding liquid colorant to the basic structures of textile products. These basic structures include fibers, yarns made from fibers, and fabrics made from yarns. The various techniques for coloring include dying individual fibers before they are formed into yarns, dying yarns before they are formed into fabrics, and dying woven or knitted fabrics.

Although the term "dye" is often used in a generic sense, those familiar with textile processes will recognize that the term "dye" most properly describes a colorant that is soluble in the material being colored. In comparison, the term "pigment" should be used to describe insoluble colorants.

Many conventional techniques for coloring synthetic filaments include the incorporation of dye into the polymer material after the filament has been extruded.

Another conventional method in the textiles industry for coloring synthetic filaments includes the "master batch" approach in which colorant is dispersed at a relatively highly concentrated level into a small sample of polymer chip. The highly concentrated colored chip polymer is introduced to the melt spinning system, blended with a larger volume of colorless virgin polymer chip and then extruded to hopefully achieve filaments with the desired color throughout the melt-spinning process. The processes associated with the master batch approach, however, can be expensive and time consuming. For example, the amount of solid dyestuffs introduced into the master batch must be precisely monitored in order to maintain a consistent color. Furthermore, it is extremely difficult to obtain a precise shade or variant of a particular color. Oftentimes it is necessary to re-extrude the polymer to obtain a required color specification of the master batch chip.

Because the masterbatch process typically uses solid dyestuffs, it raises difficulties in accurately handling the proper amounts of solids. Solids are generally harder to meter in precise amounts than are liquids or gases, harder to mix uniformly with other materials, and harder to handle as supply streams (several of which are typically required).

Furthermore, a typical masterbatch process requires multiple high-temperature process steps (i.e., compounding the dyestuff and polymer; drying the compounded mixture; and recompounding the master batch with the full polymer supply) which, both individually and collectively, can cause varying color results or even degradation of the polymer itself.

Condensation polymers offer additional challenges to the masterbatch system. As is known to those familiar with chemical reactions, a condensation polymer results from a reaction in which two monomers or oligomers react to form a polymer and a water molecule. Because such reactions produce water, they are referred to as "condensation" reactions. Because of chemical equilibrium, however, the water must be continually removed from the polycondensation reaction, otherwise it tends to drive the reaction in the other direction; i.e., depolymerize the polymer. This results in a loss of molecular weight in the polymer which is referred to as hydrolytic degradation. In particular the molecular weight (measured by the intrinsic viscosity or "IV") of polyester can easily be decreased by as much as 0.15 dl/g (0.55–0.75 dl/g is considered a good viscosity for filament). As a greater problem—and one that becomes evident during later processing of filament and yarn—the loss in IV is quite variable depending upon the quality of process control of the masterbatch drying and extrusion systems. In particular, obtaining the required color specification of the masterbatch chip sometimes requires re-extruding the polymer to obtain a desired color correction. Unfortunately, such re-extrusion for color matching purposes tends to increase the loss in molecular weight even further.

Masterbatch "chip" is generally introduced into the spinning process using several options each of which tends to provide an extra source of variation for the resulting molecular weight. Because there are several process steps during which molecular weight can be lost, the effect tends to be cumulative and significant. The overall effect is a significant reduction in the molecular weight of the filament that manifests itself as an orientation variability in the resulting yarn. In turn, the orientation variability produces a resulting variability in the physical properties of the yarn such as elongation, tenacity, and draw force.

Such variability in the physical properties of spun yarn generates several additional problems. For example, partially oriented yarn (POY) which is draw textured must exhibit uniform draw force to assure that its preaggregate tension stays within desired specifications. If the yarn properties are outside of such specifications, various problems such as twist surging occur and prevent processing the yarn at commercial speeds. Furthermore, the drawing performance of spun yarns, whether POY, low orientation yarns (LOY), fully oriented yarns (FOY), or staple, is highly dependent upon consistent elongation because the imposed draw ratio cannot exceed the inherent drawability of the spun yarn (as measured by the elongation). Additionally, consistent physical properties of the final drawn or draw textured filament are desirable for optimum performance of fabrics and other end-use products.

In a practical sense, the variation in physical properties from filament to filament, fiber to fiber, and yarn to yarn forces the various textile manufacturing processes and machinery to be continually readjusted whenever a new colored fiber or yarn is introduced. Thus, the problems inherent in masterbatch coloring tend to raise the cost and lower the productivity of later textile processes that incorporate masterbatch colored fibers and yarns.

Copending and commonly assigned application Ser. No. 08/929,831 discloses a particular technique for delivering liquid colorants into the base chip before the chip is melted and includes the use of an injector structure. The liquid colorant can be injected into an extruder or at a point just prior to a manifold system, dependent upon the placement of the injector. The liquid colorants are slowly fed into the base chip in small amounts because the colorant is highly concentrated. In this fashion, the operator is able to better control the amount of liquid colorant deposited into the base chip and, therefore, obtain the desired color during a first attempt. In certain circumstances, however, the slow-feed technique can result in the organic colorants remaining in the bore of the injector for prolonged periods of time. Consequently, the colorant may "cook" (degrade) or solidify due to the heat transfer from the extruder—which is normally heated in order to melt the polymer—to the injector structure.

The solid degradation product resulting from the prolonged heating of the colorant plugs or clogs the bore of the injector and prevents the delivery of the liquid colorant. Thus, when the injector becomes clogged, the operator must halt the production line, locate the clogged injector, and detach the injector from the machinery. Next, the operator must clear the obstruction (i.e., globule of solid dye) from the bore of the injector with specialized tools and then reattach the cleansed injector onto the machinery before resuming normal operations.

Alternatively, an operator could simply replace the defective or clogged injector with a properly functioning injector and immediately resume operations. The defective injector could then be subsequently cleaned during a routine maintenance interval. Regardless of the alternative chosen by an operator to remedy the clogged bore, the defective injector must be physically removed from the production line. Thus, the use of conventional injectors requires additional downtime to clean clogged injectors. Accordingly, there is a need for an injector structure comprising a self-cleaning means for clearing a clogged bore. Such an injector structure would allow an operator to clear the path of the clogged bore without having to remove the entire structure from the melt-spinning machinery.

As referenced above, conventional techniques of coloring textile filaments include positioning an injector adjacent to the extruder. This placement results in the heating and subsequent solidification of the liquid colorant. Accordingly, there is also a need for a cooling means in an injector to reduce the amount of heat transferred from the extruder to the injector structure.

OBJECT AND SUMMARY OF THE INVENTION

Therefore, it is an object of the present invention to provide an injector for coloring synthetic polymer filaments that allows the removal of obstructions from the delivery system without detaching the entire injector from the machinery.

It is a further object of the present invention to provide an injector for coloring synthetic polymer filaments that minimizes the adverse affect of heat from adjacent equipment on the liquid colorant remaining in the injector structure.

It is yet another object of the present invention to provide an injector for coloring synthetic polymer filaments that facilitates color changeover during the production process.

It is still another object of the present invention to provide an injector for coloring synthetic polymer filaments with enhanced long-term production performance.

Accordingly, the present invention comprises an improved injector structure for delivering liquid colorant directly to all of the polyester chip either just prior to extrusion or just prior to spinning that includes a valve body, an internal channel extending the length of the injector structure for delivering liquid colorant to a desired location, a reciprocating stem capable of traveling the entire length of the internal channel for removing or breaking up any solid matter contained therein, and an insulating jacket for preventing heat from adjacent equipment for adversely affecting the liquid colorant remaining in the injector structure. When it is desired to refrain from injecting colorant (or other additive), the injector can simply be "valved off" by pushing in the reciprocating stem. Because the injector is self-cleaning and self-cooled, downtime is avoided by avoiding the clearing or removal required when using more conventional injectors.

BRIEF DESCRIPTION OF THE DRAWINGS

The foregoing and other objects and advantages of the invention will become more apparent when taken in conjunction with the detailed description and accompanying drawings in which:

FIG. 2 is a cross-sectional view of the present invention showing a hollow housing, a reciprocating stem, a connecting means, a valve body, a sealing member, a fluid inlet, an insulating jacket, and an attaching means.

DETAILED DESCRIPTION OF THE PREFERRED EMBODIMENTS

Figure 1:
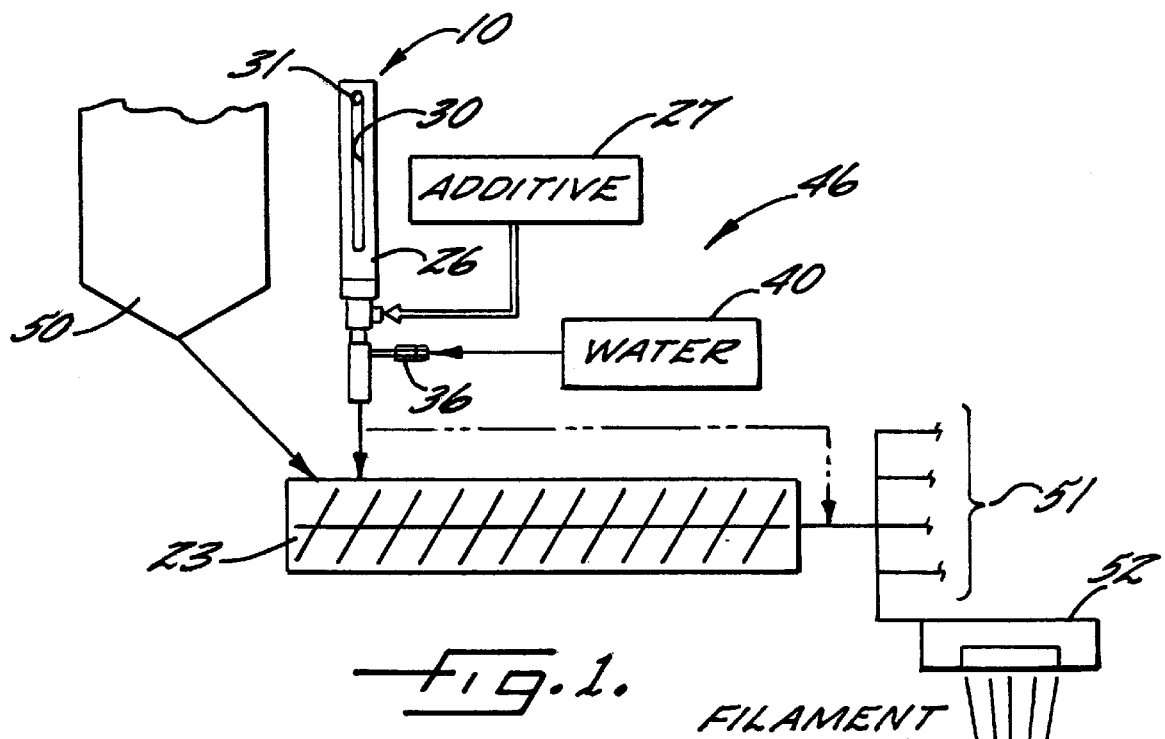
FIG. 1 is a schematic diagram of a conventional melt spinning process for producing polyester filament showing a bin, an extruder, an injector, a manifold, a spinneret, and alternative positioning of the present invention.

Although the invention has been explained in relation to its preferred embodiments, it will be understood that various modifications thereof will become apparent to those skilled in the art upon reading the specifications therefore, it will be understood that the invention disclosed herein covers such modifications as fall within the scope of the appended claims. In particular, the injector disclosed herein is useful for adding liquids of any type to a melt phase polymer process. Thus, it will be understood that although the detailed description speaks in terms of liquid colorants, the disclosed and claimed injector can be used with a variety of liquid additives that are otherwise compatible with the polymer and the melt-phase equipment.

The present invention is an apparatus for coloring synthetic polymer filaments to form color yarns and fabrics in a melt spinning process, and more particularly relates to an injector structure for delivering liquid colorant into a polyester production system.

As shown in FIG. 2, an injector structure 10 for delivering liquid colorant into a polyester production system includes a valve body 11 having an upstream end 12 and a downstream end 13, a fluid inlet 14 positioned between the upstream end and downstream end of the valve body, a reciprocating stem or plunger 15 for valving the liquid colorant between the fluid inlet and a discharge opening 20 at the downstream end of the valve body, and an insulating jacket 16 for preventing heat from a melt phase polymer from adversely affecting the liquid colorant in the valve body surrounding a portion of the valve body. The discharge opening 20 at the downstream end 13 of the valve body forms a nozzle 21.

The present invention includes means for attaching the downstream end 13 of the valve body 11 to a container shown as an extruder 23 in FIG. 2. In the illustrated embodiment, the injector 10 is threaded into the opening 22 in the extruder 23 with the opening 22 threadedly receiving the downstream end 13 of the valve body 11. A thermally insulating ceramic washer 28 helps seal the injector 10 to the extruder 23. Upon securing the injector 10 to the extruder 23, the nozzle 21 can deliver liquid colorant directly to the chip polymer prior to melting.

The injector 10 also includes an internal channel 24 which extends longitudinally within the injector structure and portions of which are in fluid communication with the discharge opening 20. A downstream portion of the internal channel 24 includes a first axial bore 25 defined by the valve body 11. The fluid inlet 14 for receiving liquid colorant from an external source 27 (shown in FIG. 1) is positioned between the upstream end 12 and downstream end 13 of the valve body 11. The fluid inlet 14 extends perpendicular to and is in fluid communication with the internal channel 24 and specifically the first axial bore 25. As shown in FIGS. 1 and 2, liquid colorant flows from the external source 27, through the fluid inlet 14, into the first axial bore 25 disposed within the valve body 11, and eventually flows out of the discharge opening 20 and nozzle 21.

The reciprocating stem or plunger 15 is provided for valving the liquid colorant between the fluid inlet 14 and the discharge opening 20. The reciprocating stem 15 is substantially the same diameter as the internal channel 24. In an advantageous self-cleaning fashion, the reciprocating stem 15 clears the channel 24 of any obstructions disposed within the channel when the stem is reciprocated between an upward and downward position. In an upward position, the reciprocating stem 15 permits liquid colorant to travel from the external source 27, through the fluid inlet 14, along the internal channel 24 and to the discharge opening 20. Alternatively, in a downward position, the reciprocating stem 15 prevents liquid colorant from entering the internal channel 24 (or first axial bore 25). As depicted in FIG. 2, a lower portion of the reciprocating stem 15 remains in an upstream portion of the first axial bore 25 when the stem is in an upward position.

A hollow housing 26 supports the reciprocating stem 15 in the upward and downward position. The housing 26 defines at least one slot 30 extending the length of the housing which is adapted to slidably receive a finger 31 projecting outwardly from an upper portion of the reciprocating stem 15 when the stem is reciprocated. The present invention further includes a means for connecting the hollow housing 26 and valve body 11, such as a coupling sleeve 32 as depicted in FIG. 2. The coupling sleeve 32 connects the housing 26 to the upstream end 12 of the valve body 11.

In a preferred embodiment, the coupling sleeve 32 includes opposing upstream and downstream ends and a second axial bore 33. The upstream end of the coupling sleeve 32 is externally threaded so that the hollow housing 26 having an internally threaded end can be mounted thereon. The downstream end of the coupling sleeve 32 is internally threaded so that the valve body 11 having an externally threaded upstream end can be secured thereto. The coupling sleeve 32 defines an upper portion of the internal channel 24 as shown in FIG. 2 as a second axial bore 33, within which the stem 15 may be reciprocated.

In order to perform the cleaning of the injector structure 10, an operator manipulates the projecting finger 31 connected to the upper portion of the stem 15, thereby causing the stem to travel the length of the first 25 and second 33 axial bores, comprising the internal channel 24 and remove any globules of solidified colorant blocking the internal channel and preventing liquid colorant flow. Accordingly, the stem 15 is reciprocated within the hollow housing 26, the second axial bore 33 disposed within the coupling sleeve 32, and the first axial bore 25 disposed within the valve body 11.

As described, the threaded opening 22 secures the downstream end 13 of the valve body 11 to an extruder 23 for hot melt phase polymers. By attaching the injector structure 10 to the extruder 23, liquid colorant is delivered directly from the discharge opening 20 into the polyester production system just prior to melting. When the injector structure 10 is placed in close proximately to the extruder 23 the organic colorants remaining in the first axial bore 25 of the injector may cook or solidify due to the heat transfer from the extruder 23 to the injector structure 10. This adverse effect on the liquid colorant results from those colors being slowly fed into the base chip in small amounts because the colorant is highly concentrated.

Figure 3:
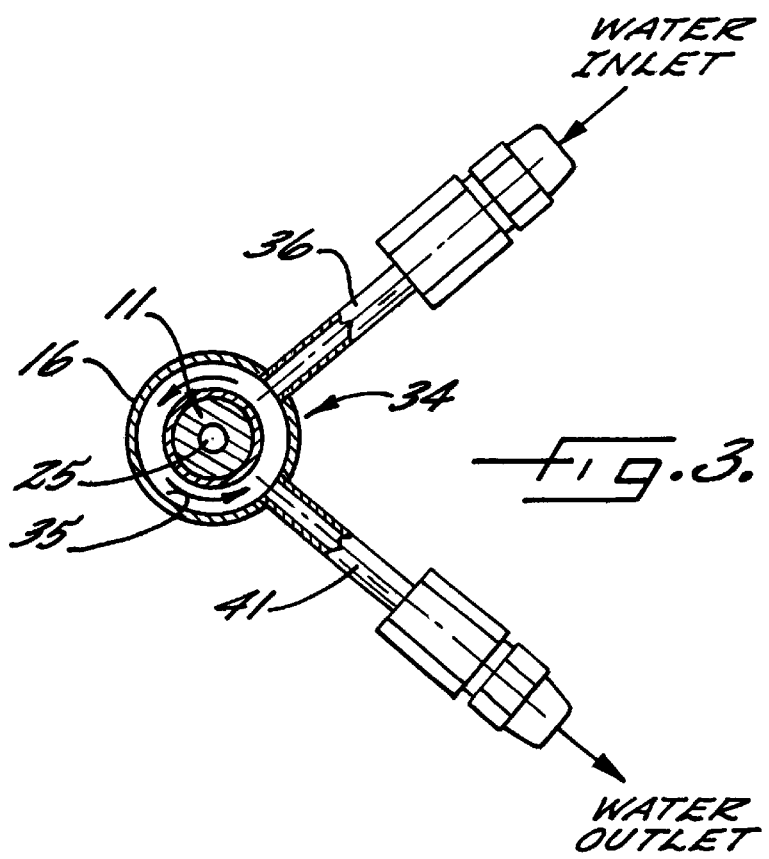
FIG. 3 is a top-plan view of the present invention taken along lines 3—3 depicting an insulating jacket defining a duct surrounding the periphery of the valve body, a water inlet, and a water outlet.

To alleviate the problem of the injector 10 becoming clogged with solid degradation products, a preferred embodiment of the present invention provides for an insulating jacket 16 which is depicted in FIG. 3 as a water jacket 34 for preventing heat from a hot polymer (i.e., heated chip or fully molten) or its container from adversely affecting the liquid colorant in the valve body 11. As shown in FIG. 3, the water jacket 34 surrounds portions of the valve body 11 between the fluid inlet 14 and the discharge opening 20. The water jacket 34 defines a duct 35 for circulating water around the circumference of the valve body 11 and the first axial bore 25 disposed therein. The water jacket 34 includes an inlet 36 for delivering water from an external source 40 (shown in FIG. 1) to the duct 35. The water jacket 34 also includes an outlet 41 for removing water from the duct 35. In a preferred embodiment depicted in FIG. 3, the inlet 36 and outlet 41 are spaced apart around the periphery of the valve body 11. The waterjacket 34 may be mounted externally to the valve body 11 or, in the alternative, may be an integral part of the valve body. It will be understood, of course, that coolants other than water can be used in the jacket 34, but that water is typically most convenient.

During the operation of the valve structure 10, an amount of liquid colorant may flow or "seep" from the first axial bore 25 within the valve body 11 and into a chamber 42 defined by internal surfaces of the coupling sleeve 32. In order to minimize the flow or "seepage" of liquid colorant from the upstream end 12 of the valve body 11 and into the chamber 42, means for sealing is provided in the injector structure 10 and depicted by a flexible sealing membrane 43 in FIG. 2. The sealing membrane 43 is removably secured to the valve body 11 within a recess 44 defined by the upstream end 12 of the valve body. The sealing membrane 43 defines an orifice 45 of substantially the same diameter as the reciprocating stem 15 which extends the length of the membrane. Thus, the stem 15 can be reciprocated within the membrane 43 while the membrane acts as a seal to prevent excess liquid colorant from leaking into to the chamber 42 disposed within the coupling sleeve 32.

FIG. 1 systematically illustrates a system 46 for producing colored polyester from melt phase polymer and a liquid colorant. The system 46 includes a polyester supply container 50 such as a bin or hopper positioned adjacent to a melt extruder 23, an injector structure 10 for delivering liquid colorant to the system, a water supply 40 connected to the injector for cooling the liquid colorant, and a colorant supply 27 in fluid communication with the injector for delivering liquid colorant thereto. A manifold 51 is located downstream from the melt extruder 23.

The polyester supply container 50 feeds base chip to the extruder 23 which eventually extrudes melt phase polyester. As shown in FIG. 1, the injector 10 can be positioned to deliver liquid phase colorant directly into the solid phase polymer contained in the melt extruder 23 just prior to melting. Alternatively, the injector 10 can be positioned downstream of the extruder 23 and just prior to the manifold 51.

The system 46 further includes at least one spinneret 52 located downstream from the melt extruder 23. Alternatively, the spinneret 52 may be positioned downstream from the manifold 51 as depicted in FIG. 1. The spun filament produced by the system 46 can be collected by a take up means (not shown).

That which is claimed:

1. An injector structure for delivering liquid colorant into a polyester production system, said injector structure comprising:

a valve body that defines respective upstream and downstream ends, and with said downstream end defining a discharge opening;

an internal channel extending longitudinally inside said valve body and communicating with said discharge opening;

a fluid inlet positioned between said upstream and downstream ends of said valve body and in communication with said internal channel for delivering liquid colorant from an external source to said internal channel;

a reciprocating stem in said internal channel for valving the liquid colorant between said inlet and said discharge opening based on the position of said stem in said channel, and for clearing said channel of obstructions disposed therein when said stem reciprocates in said channel;

means for attaching said downstream end and said discharge opening of said valve body to a container for hot melt phase polymers; and an insulating jacket surrounding the portions of said valve body between said fluid inlet and said discharge opening for preventing heat from a hot polymer or its container from adversely affecting liquid colorant in said valve body.

2. An injector structure according to claim 1 wherein said internal channel defines a first axial bore.

3. An injector structure according to claim 1 wherein said injector structure further comprising a hollow housing for receiving said reciprocating stem and a connecting means for connecting said housing to said valve body.

4. An injector structure according to claim 1 wherein said connecting means comprising a coupling sleeve having opposite upstream and downstream portions and so that each portion defines an end, wherein said upstream end is externally threaded so that said sleeve is adapted to threadedly mount said hollow tube having an internally threaded end and said downstream end is internally threaded so that said downstream end of said sleeve is adapted to threadedly connect said valve body therein having an externally threaded upstream end.

5. An injector structure according to claim 4 wherein said coupling sleeve defines a second axial bore for receiving said reciprocating stem.

6. An injector structure according to claim 1 wherein said fluid inlet extends perpendicular to said internal channel.

7. An injector structure according to claim 1 wherein said reciprocating stem is a plunger.

8. An injector structure according to claim 1 whereby said reciprocating stem in an upward position permits liquid colorant to travel from said fluid inlet along said internal channel and to said discharge opening.

9. An injector structure according to claim 1 whereby said reciprocating stem in a downward position prevents liquid colorant from entering said internal channel.

10. An injector structure according to claim 1 whereby a portion of said reciprocating stem in an upward position remains in said internal channel.

11. An injector structure according to claim 1 wherein said attaching means is attached to an extruder for hot melt phase polymers.

12. An injector structure according to claim 1 wherein said insulating jacket defines a duct for circulating a coolant around the circumference of said valve body.

13. An injector structure according to claim 1 wherein said insulating jacket further comprises an inlet in fluid communication with said duct for delivering water to said duct and an outlet in fluid communication with said duct for removing water from said duct.

14. An injector structure according to claim 13 wherein said inlet and said outlet are spaced apart.

15. An injector structure according to claim 1 wherein said insulating jacket is mounted externally to said valve body.

16. An injector structure according to claim 1 wherein said insulating jacket is integral with said valve body.

17. An injector structure according to claim 1 further comprising a means for sealing said upstream end of said valve body and thereby preventing liquid colorant from flowing out of said upstream end of said valve body.

18. An injector structure according to claim 1 wherein said stem further comprises at least one finger projecting outward from an upper end of said stem for reciprocating said stem within said hollow housing, said coupling means, and said valve body.

19. An injector structure according to claim 1 wherein said hollow housing defines at least one longitudinally extending slot for slidably receiving said at least one outwardly projecting finger.

* * * * *